United States Patent
Kinard et al.

(10) Patent No.: US 6,480,371 B1
(45) Date of Patent: Nov. 12, 2002

(54) ALKANOLAMINE-PHOSPHORIC ACID ANODIZING ELECTROLYTE

(75) Inventors: John Tony Kinard, Simpsonville, SC (US); Brian John Melody, Greer, SC (US); David Alexander Wheeler, Williamston, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/496,287

(22) Filed: Feb. 1, 2000

(51) Int. Cl.⁷ .................... H01G 9/145; H01G 35/00
(52) U.S. Cl. .................. 361/508; 361/504; 361/503; 361/527; 252/62.2
(58) Field of Search ........................... 361/508, 504, 361/505, 433, 327, 527, 503; 205/324, 325; 252/62.2; 523/160, 161

(56) References Cited

U.S. PATENT DOCUMENTS

| | | | |
|---|---|---|---|
| 3,609,467 A | * 9/1971 | Curtis | 317/230 |
| 3,943,041 A | 3/1976 | Jackson | |
| 4,408,258 A | * 10/1983 | Dapo | 361/433 |
| 4,447,346 A | 5/1984 | MacNamee et al. | |
| 4,479,166 A | 10/1984 | Finkelstein et al. | |
| 4,692,224 A | 9/1987 | Bernard et al. | |
| 4,781,802 A | 11/1988 | Fresia | |
| 4,846,947 A | * 7/1989 | Sotoya et al. | 204/182.4 |
| 4,885,660 A | 12/1989 | Dapo | |
| 5,111,365 A | 5/1992 | Dapo | |
| 5,160,653 A | * 11/1992 | Clouse et al. | 252/62.2 |
| 5,306,739 A | * 4/1994 | Lucey | 522/42 |
| 5,519,567 A | 5/1996 | Dapo | |
| 5,629,829 A | * 5/1997 | Ikeya | 361/505 |
| 5,687,057 A | 11/1997 | Dapo | |
| 5,690,807 A | * 11/1997 | Clark, Jr. et al. | 205/655 |
| 5,716,511 A | * 2/1998 | Melody et al. | 205/324 |
| 5,935,408 A | * 8/1999 | Kinard et al. | 205/234 |
| 6,010,816 A | * 1/2000 | Nishio et al. | 430/165 |
| 6,261,434 B1 | * 7/2001 | Melody et al. | 205/171 |

FOREIGN PATENT DOCUMENTS

| | | |
|---|---|---|
| DE | 1805951 | 6/1970 |
| GB | 2168 383 A | 6/1986 |
| RU | 876802 | 10/1981 |
| WO | WO 98/19811 | 5/1998 |

OTHER PUBLICATIONS

N. F. Jackson and J.C. Hendy, "The Use Of Niobum As An Anode Material In Liquid Filled Electrolytic Capacitors" Gordon & Breach Science Publisher, Ltd., Electrocomponent Science and Technology, 1974, vol. 1, pp. 27–37.

* cited by examiner

Primary Examiner—Anthony Dinkins
Assistant Examiner—Nguyen Ha
(74) Attorney, Agent, or Firm—Banner & Witcoff LLP

(57) ABSTRACT

Electrolytes containing water, phosphoric acid, at least one organic solvent, and at least one alkanolamine can be used for anodizing valve metals prepared from metal powder having a surface area of least 0.35 $m^2/g$ or 35,000 CV/g. The anodizing electrolytes have relatively high conductivity and are capable of being used at high anodizing currents. The anodic film produced by these electrolytes on valve metals is of substantially uniform thickness and has improved electrical parameters.

22 Claims, No Drawings

ALKANOLAMINE-PHOSPHORIC ACID ANODIZING ELECTROLYTE

BACKGROUND OF THE INVENTION

1. Field of the Invention

The present invention is directed to electrolytic solutions suitable for anodizing valve metal anodes prepared from fine powders, to methods of preparing capacitors, and to capacitors prepared with fine powder anodes and suitable electrolytes

2. Description of Related Art

The enormous growth experienced by the electronics industry since WWII is due, at least in part, to the relative reduction in the cost of electronics circuits over time. This reduction in the relative cost of electronics makes possible the introduction of an ever larger number of consumer electronic devices at prices which the general public finds sufficiently attractive for mass consumption. A portion of the relative reduction in the cost of consumer electronics goods is a function of the economies of large scale mass production, but a greater portion of the reduction in cost is due to the ever increasing scale of circuit integration which has made possible the fabrication of an increasingly larger number of circuit components of progressively smaller size on circuit chips of silicon and other materials.

Some components have proven difficult to integrate into the integrated circuit structure and are still mounted separately on circuit boards, either separately or in modular groups. In order to reduce the cost of electronics as a whole, manufacturers of the individual components have been forced to reduce the cost of these components in the same general fashion as the integrated circuit manufacturers.

One circuit component which is found in most advanced circuits is the solid tantalum capacitor. The high capacitance per unit volume, low leakage current, and high reliability of solid tantalum capacitors have made them the capacitor of choice for many circuit applications and these devices are now manufactured at a rate exceeding 1,000,000,000 devices per month worldwide.

Solid tantalum capacitors are fabricated by pressing tantalum powder to produce compacts at ¼ to ¾ of the theoretical density, followed by high temperature (~1200° C. to 2200° C.) vacuum sintering to produce the capacitor anodes. Electrical connection to the individual anodes is made through valve metal wire, typically tantalum wire. Tantalum wires are partially imbedded in the compacts during the pressing step or are welded to the compacts after sintering.

The sintered, powder metallurgy tantalum anodes are suspended by the tantalum wires in an electrolytic solution and are anodized to produce the dielectric layer on all surfaces and within all of the interstices of the anodes. The tantalum anode acts as the anode capacitor plate and the anodic oxide acts as the capacitor dielectric.

After anodizing, the counter electrode or cathode capacitor plate is applied by filling the pores or interstices of the anodes with manganese dioxide, conductive salts, or an intrinsically conductive polymer. Layers of conductive carbon and conductive paint are generally applied to produce the finished capacitor body ready for lead attachment and encapsulation.

Efforts to reduce the cost of solid tantalum capacitors have tended to concentrate on the reduction in the particle size of the tantalum powder so as to produce a larger amount of useful tantalum surface area upon which the dielectric oxide may be anodically grown per gram of tantalum powder. A lower weight of tantalum is required per capacitor with higher surface area tantalum powders, which makes possible a reduction in the cost of the capacitors produced (due to the reduced amount of tantalum consumed per device produced.) Tantalum powders having higher surface area per unit weight also make possible a reduction in the physical size of capacitors having a given rating since smaller anode bodies may be used for the same capacitance and oxide thickness.

The use of high surface area tantalum powders (i.e., tantalum powders having more than about 0.4 square meters per gram after sintering and having approximately 40,000 microcoulombs per gram, or more) has been found to have some disadvantages as well as the obvious advantages of smaller anode size and lower anode cost. The major disadvantage of high CV tantalum powders observed with the anodes produced with these powders is that the smaller size of the tantalum particles which make up these powders is accompanied by smaller pores between the particles in the interstices of the anodes. During the anodizing process used to produce the dielectric oxide, the current must travel through the electrolyte solution contained within the pores of the anodes. As the surface area of the tantalum powders increases, the amount of current flow per unit of anode volume increases (at least with the commonly employed industry practices of applying a fixed amount of current per unit of surface area of the powder contained within the sintered anodes or the application of a fixed rate of voltage rise per unit time with the current allowed to increase until a pre-set voltage is achieved.) This increase in current flow per unit of anode volume and the increasingly difficulty of diffusion of electrolyte species within the interstices of the anodes with increasingly high surface area tantalum powders leads to a deposit of relatively insoluble phosphate species within the interstices of the anode bodies when the anodizing process is carried out in traditional aqueous phosphoric acid or aqueous phosphoric acid/ethylene glycol electrolytes (as described in co-pending application Ser. No. 09/143,373, hereby incorporated by reference in its entirety.

The presence of relatively insoluble phosphate species within the interstices of anodized tantalum (or other valve metal) powder metallurgy anodes produced from high surface area metal powders and anodized in traditional aqueous phosphoric acid solutions, with or without ethylene glycol present in the solution, gives rise to less complete anode impregnation with manganese dioxide, higher dissipation factors, and higher d.c. leakage values per unit of capacitance than are obtained with anodes which do not contain these insoluble phosphate deposits.

Co-pending application Ser. No. 09/143,373 describes the use of electrolyte solutions for anodizing anodes fabricated from high surface area valve metal powders which avoid or greatly minimize the deposition of insoluble phosphate species while maintaining phosphate ions in the solution through the use of alkali metal phosphate salts in combination with aqueous solutions of polyethylene glycol, polyethylene glycol mono methyl ether, and/or polyethylene glycol di methyl ether. The presence of phosphate in the anodizing solution, and hence in the anodic oxide, is associated with increased thermal stability. The near neutral pH of these electrolyte solutions (i.e., pH=5 to 9) renders these solutions much less corrosive to stainless steel tank components and thus reduces the metal contamination of the electrolytes to much lower levels than is commonly found in phosphoric acid electrolytes (which may have a pH of 2 or less, and are therefore much more acidic and corrosive.)

The lower concentrations of metal ion contamination (i.e., chromium, nickel, iron) generally observed with the electrolyte solutions of co-pending application Ser. No. 09/143,373 prevents or greatly reduces the deposition of metallic phosphates within the interstices of the anode bodies anodized in these solutions.

It was discovered that even low pH phosphoric acid-containing electrolyte solutions containing little metallic contamination, deposit a sparingly soluble phosphate species, probably polyphosphoric acid, within the interstices of anodes fabricated from high surface area valve metal powders. This deposition of insoluble phosphate species from relatively metal contamination-free phosphoric acid electrolytes eliminates the relatively simple solution to the problem of phosphate species deposition via constant circulation of the electrolytes through a cation exchange resin (such as polystyrene/poly divinyl benzene sulfonate) to remove metal ion contamination. Although such practice will minimize metal ion contamination, insoluble phosphate species of the polyphosphoric acid type still deposit in high surface area anodes if low pH, phosphoric acid-containing electrolytes are employed for anodizing anodes fabricated from high surface area valve metal powders. Fortunately, the electrolytes described in co-pending application Ser. No. 09/143,373, which contain alkali metal phosphate salts in place of phosphoric acid, act to prevent the deposition of polyphosphoric acid due to the higher pH values of these electrolytes.

The use of such electrolytes, however, is not totally devoid of disadvantages. The valve metal riser wires which connect the porous valve metal anode bodies to the metal strips or other support structures used to suspend the anode bodies in the anodizing electrolyte are generally made as short as possible so as to facilitate complete anode coverage with the electrolyte solution without the solution making direct contact to the support bars (known as bridging). Should the solution make direct contact with the support bars, the electrical circuit is "short-circuited" and current will pass from the bars to the electrolyte solution resulting in corrosion of the bars.

In spite of the care which is taken in the anodizing of valve metal anodes, some of the electrolyte solution invariably wicks up the valve metal riser wires and contacts the metal anode support bars. The wicking contact of the electrolyte to the carrier bars results in only minor current flow due to the small conducting path cross-section, but with the electrolyte solution described in the co-pending application, alkali metal phosphate salts tend to accumulate on the support bars through evaporation of the liquid portion of the electrolyte solutions. Usually this accumulation of alkali metal phosphate salts is of little consequence so far as the anode quality is concerned. The major concern associated with the accumulated alkali metal phosphate deposits on the carrier bars is that the deposits tend to dissolve relatively slowly during the rinse step to which the anodes are subjected following the anodization process. The relatively slow deposit dissolution rate renders difficult the monitoring of the thoroughness of the rinse process via rinse water conductivity measurements due to the contribution by the deposits on the bars. That is, if an overflowing rinse is used to clean the anodes, the contribution to rinse water conductivity by the deposits makes it difficult to measure the contribution made by the electrolyte diffusing from the interstices of the anodes; a low rinse water conductivity value being associated with clean anodes and signifying the point in time at which to terminate the rinse process. The absence of phosphate deposits on the carrier bars or deposits which dissolve rapidly would be desirable so as to better facilitate the determination of the completion of post-anodizing anode rinsing via overflow conductivity monitoring.

Additionally, while the electrolytes described in the co-pending application give much improved results over aqueous phosphoric acid electrolyte solutions, with or without the presence of ethylene glycol, when used to anodize powder metallurgy anode compacts to about 100 volts or less, it is desirable to be able to formulate electrolytes for higher voltage use (i.e. for over about 100 volts) from the same materials as those used to formulate lower-voltage electrolytes so as to keep to a minimum the number of different materials which must be kept on-hand at a manufacturing site which produces powder metallurgy capacitor anodes of various voltage ratings. This is usually accomplished by increasing the organic content of the electrolyte from a relatively low concentration (10–25%) to a relatively high concentration (50–70%) and employing a sufficient amount of ionogen to obtain the desired resistivity. Unfortunately, this approach has not proved to be productive with the materials described in the co-pending application. In most cases, the limited solubility of alkali metal phosphates in the solvents of the co-pending application has prevented the realization of the desired conductivities in the anodizing electrolyte solutions. The relatively poor conductivities obtained with aqueous alkali metal phosphate solutions containing more than about 55% of the organic solvents described in the co-pending application makes necessary long hold times at voltage in these electrolytes to obtain a uniform oxide thickness and the quality of the anodic oxide dielectric has been found to be generally inferior to that produced by traditional, aqueous phosphoric acid electrolyte solutions containing 55–60% ethylene glycol.

SUMMARY OF THE INVENTION

The present invention addresses the above-described shortcomings of traditional anodizing electrolytes and the shortcomings of the electrolytic solution of the co-pending application, in preparing capacitors from anodes made from fine metal powders.

The present invention is directed to an electrolytic solution comprising at least one alkanolamine, water, phosphoric acid, and at least one organic solvent.

The present invention is directed to a capacitor prepared from a fine metal powder anode, wherein the surface area of the fine metal powder is greater than 0.35 $m^2/g$. The capacitor is prepared by anodizing the fine metal powder electrode using an electrolytic solution comprising at least one alkanolamine, phosphoric acid, water, and at least one organic solvent.

The present invention is also directed to a method of anodizing a fine metal powder anode where a film is formed on the fine metal powder anode using the above-described electrolytic solution. The fine metal powder is preferably a valve metal powder, such as tantalum, having a surface area greater than 0.35 $m^2/g$. The film is formed at a temperature of from about 60° C. to about 100° C.

It is to be understood that both the foregoing general description and the following detailed description are exemplary and explanatory only and are not restrictive of the present invention as claimed.

DETAILED DESCRIPTION OF THE INVENTION

A drawback of the electrolytes described in co-pending application Ser. No. 09/143,373 stems from the presence of the alkali metal ion component in these electrolytes. Although the presence of the alkali metal component of these electrolytes makes possible the near-neutral pH (which minimizes anodizing tank corrosion and largely eliminates phosphate deposits within powder metallurgy anodes anodized with these electrolytes), the presence of alkali metal ions also increases the amount of phosphate materials deposited up the anode carrier bars and contributes to the insolubility of these deposits.

The electrolytes of co-pending application Ser. No. 09/143,373 contain alkali metal ions in order to raise the electrolyte solution pH to the near-neutral region. Another method of increasing the pH of phosphate solutions to the near-neutral region is to add one or more amines to solutions containing phosphoric acid. The amines form phosphate salts which are soluble in the partially non-aqueous solvents of the anodizing electrolytes. However, it was discovered that the amines must have sufficiently high boiling points to minimize evaporation from anodizing electrolytes at elevated temperatures as anodizing is frequently carried out at temperatures of 80° C. to 90° C.

It was further discovered that the class of amines which contain hydroxyl groups, known as alkanolamines, generally have boiling points sufficiently high for practical use in anodizing electrolytes. Table 1 compares alkyl amine boiling points with alkanolamine boiling points.

|  | Boiling Point ° C. |
|---|---|
| Alkyl Amine | |
| mono ethyl amine | 17 |
| di ethyl amine | 56 |
| tri ethyl amine | 89 |
| di ethyl methyl amine | 65 |
| Alkanolamine | |
| mono ethanol amine | 170 |
| di ethanol amine | 270 |
| tri ethanol amine | 295 |
| ethyl di ethanol amine | 251 |
| di ethyl ethanol amine | 161 |
| di methyl ethanol amine | 134 |
| di methyl amino ethoxy ethanol | 205 |

It was further discovered that aqueous solutions of an organic solvent in combination with phosphoric acid and one or more alkanolamines and having a near neutral pH, form a series of electrolytes which are useful for the anodizing of powder metallurgy valve metal anodes.

The organic solvent is preferably at least one solvent selected from monomeric glycols, glycerine, polyethylene glycols, polyethylene glycol monomethyl ethers, and polyethylene glycol dimethyl ethers. Suitable monomeric glycols include, but are not limited to, ethylene glycol, propylene glycol, butylene glycols (butane diols), and 2-methyl-1,3-propane diol. Glycerine may also be used. The amount of organic solvent should be less than the solubility limit of the organic solvent in water. The amount of organic solvent is generally above about 1 vol % and less than about 70 vol % of the electrolytic solution and depends on whether the solution is being used for low or high voltage anodizing.

A sufficient quantity of the alkanolamine is used to form an electrolyte having a near neutral pH of about 5 to about 9 which is the same pH neutrality as the alkali metal ions provided in the electrolytes described in the co-pending application. The amount of alkanolamine is generally between about 0.1 vol % and about 10 vol % of the total volume of the electrolytic solution.

The alkanolamine reacts with the phosphoric acid to form alkanolamine phosphate salts. Solutions of alkanolamine phosphates in aqueous polyethylene glycol, polyethylene glycol mono methyl ether, and/or polyethylene glycol di methyl ether may easily be formulated for low- or high-voltage anodizing of powder metallurgy compacts.

Phosphate-containing electrolytes formulated with alkanolamines tend to be non-corrosive to anodizing tanks, and not subject to the formation of polyphosphoric acid deposits inside powder metallurgy anodes during anodizing as is found with low pH (less than about 4), phosphate-containing anodizing electrolytes. Thus, anodizing electrolytes containing the same organic component and at the same percentage as the electrolytes described in the co-pending application, but containing alkanolamine phosphates in place of alkali metal phosphates greatly reduce the amount of phosphate deposits on the carrier bars which support the anodes. Further, the deposits which do form tend to dissolve much more readily during rinsing of the anodes after anodizing.

Low voltage powder metallurgy anodes are anodes anodized to less than about 100 to 150 volts and generally fabricated from valve metal powders having 0.35 $m^2$/gram or more surface area and a CV product of more than about 35,000 microcoulombs/gram with a solution temperature of approximately 80 to 90° C. For anodizing such low-voltage powder metallurgy anodes, about 5 to 35 vol %, preferably about 10 to about 25 vol %, of glycols, polyethylene glycol, polyethylene glycol mono methyl ether, and/or polyethylene glycol di methyl ether is combined with about 0.1 vol % to about 2 vol % phosphoric acid. A sufficient amount of an alkanolamine is added to give a pH of about 5 to about 9, preferably about 7. Although a wide range of phosphoric acid to alkanolamine ratio may be used, it is preferable that the ratio provide a near neutral pH.

High-voltage powder metallurgy anodes are generally anodized above about 100 to 150 volts and fabricated from valve metal powder having less than about 0.35 $m^2$/gram or less than about 35,000 microcoulombs/gram. For anodizing such high-voltage powder metallurgy anodes, about 50 to about 70 vol % of glycols, polyethylene glycol, polyethylene glycol mono methyl ether, and/or polyethylene glycol di methyl ether is combined with about 0.1 vol % to about 2 vol % phosphoric acid. A sufficient amount of an alkanolamine is added to provide a resistivity of about 500 ohm-cm to about 2000 ohm-cm at 80° C. to 90° C.

For both low and high voltage anodes, the anodizing is typically carried out with a fixed current or a fixed rate of voltage rise until a preselected voltage is reached. Upon reaching this voltage, the anodes are held at voltage for a period of time to stabilize the anodic oxide. Such low- and high-voltage anodizing techniques are well within the skill of the art.

Valve metal powders suitable for use with the present invention are metals of Groups IV and V of the periodic table including aluminum, niobium, titanium, tantalum, and zirconium. Tantalum, niobium, and niobium alloys with titanium, aluminum, or zirconium, including niobium treated with nitrogen, are particularly suitable for anodization.

The present invention is particularly directed to powder metallurgy anodes fabricated from high surface area metal powder. High surface area powder is defined as powder having at least 0.35 $m^2$/g or 35,000 CV/g, preferably at least 0.5 $m^2$/g or 50,000 CV/g.

The following examples are for purposes of illustration and are not intended to limit the scope of the claimed invention.

EXAMPLES

Example 1

Two electrolytes were prepared:
A (control) 10 vol % polyethylene glycol 300 2 wt % dibasic potassium phosphate pH=7.5, 1 kHz Resistivity=35 ohm-cm @ 80° C.
B.(inventive) 10 vol % polyethylene glycol 300 0.2 vol % phosphoric acid (85%) 0.6 vol % triethanolamine pH=7, 1 kHz Resistivity=280 ohm-cm @ 80° C.

A batch of tantalum anodes fabricated from 50,000 CV/gram (approx. 0.5 square meters/gram after sintering) tantalum powder was split in two groups. One group was anodized in electrolyte A, the remaining group in electrolyte B. The electrolytes were maintained at the same temperature (80° C.) and the same current density was used for both groups. The anodizing voltage (33 volts) was the same for both groups. The anodes were then impregnated with manganese dioxide and coated with graphite and silver paint to produce completed capacitors ready for lead attachment/encapsulation. These devices would normally be rated as 100 $\mu F$ capacitors at 10 working volts.

The electrical parameters were then determined for the devices anodized in the two electrolytes:

| Electrolyte | Capacitance ($\mu F$) | D.F. (%) | E.S.R. (ohms) | Leakage Current ($\mu A$) |
| --- | --- | --- | --- | --- |
| A | 99.04 | 3.23 | 0.141 | 0.478 |
| B | 107.72 | 3.42 | 0.136 | 0.562 |

The performance is virtually the same. The anodes anodized in the electrolyte of the present invention exhibit the same electrical performance as the type described in co-pending application Ser. No. 09/143,373.

Example 2

The following electrolyte was prepared:
10 vol % polyethylene glycol 300
1 vol % phosphoric acid (85%)
1.46 vol % mono ethanol amine
pH=7, 1 kHz Resistivity=50 ohm-cm @ 80° C.

This is very close to the 35 ohm-cm @ 80° C. resistivity of electrolyte A in example 1. The resistivity may be reduced further by increasing the phosphoric acid and mono ethanol amine concentrations.

Example 3

Two groups of anodes were anodized in the electrolyte designated Group B in Example 1. These anodes were then impregnated with manganese dioxide and coated with carbon and silver paint to produce finished capacitor bodies. These capacitors were then attached to lead frames and were epoxy encapsulated to produce finished capacitors. The electrical characteristics of these capacitors were then measured (average of groups):

| Group | Rating | Cap | D.F. | E.S.R. | DCL | % Yield |
| --- | --- | --- | --- | --- | --- | --- |
| C | 22 $\mu F$/25 volts | 23.34 $\mu F$ | 1.59% | 0.193 ohms | 0.357 $\mu A$ | 89.2 |
| D | 10 $\mu F$/35 volts | 10.24 $\mu F$ | 1.22% | 0.245 ohms | 0.117 $\mu A$ | 90.6 |

The electrolytes of the present invention may be formulated so as to be suitable for anodizing medium-voltage anodes to produce devices having good electrical characteristics and at high yields.

Example 4

Tantalum anodes, rated 3.9 $\mu F$ @ 75 V, were prepared from H. C. Starck QR-12 tantalum powder and TPX tantalum wire. (TPX tantalum wire is free from the presence of rare earth oxides which can be used to stabilize the wire against high temperature grain growth, but which also tend to result in blister-like oxide flaws on the wire surfaces inside the anode bodies when anodized to high voltages.) A number of these anodes were carefully welded to capacitor carrier bars so as to not damage the anode surfaces and edges. These anodes were then anodized to 296 volts at 80 C. in an electrolyte of the present invention having the following composition:
60 vol % polyethylene glycol 300
0.15 vol % phosphoric acid (85%)
0.45 vol % di methyl ethanol amine
pH=7, 1 kHz Resistivity=900 ohm-cm @ 80° C.
Final current after 6 hours at voltage=0.023 amperes (80 anodes).

The anodes were then rinsed thoroughly and were heat-treated at 400 ° C. for 30 minutes (to further stabilize the oxide.) Following heat-treatment, all 80 anodes were returned to the electrolyte and 396 volts was reapplied for 3 hours. At the end of 3 hours, the final current=0.001 amperes, an extremely low final current value. The anodes were then rinsed thoroughly and dried.

Scanning electron microscopy of both the external anode surfaces and the internal surfaces of several anodes (which were split open to facilitate examination of the internal surfaces) revealed the near-total absence of blister-like flaws which are known to be the primary cause of high leakage currents in higher voltage anodes. (See U.S. Pat. No. 5,716,511, hereby incorporated by reference in its entirety.) Thus, the electrolytes of the present invention may be readily formulated to provide successful results in the anodizing of high-voltage-rated tantalum capacitors.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. An aqueous anodizing electrolytic solution comprising about 0.1 vol % to about 2.0 vol % phosphoric acid, above about 1 vol % to about 70 vol % of at least one organic solvent and about 0.1 vol % to about 10 vol % of at least one alkanolamine, wherein the electrolytic solution is suitable for anodizing metal anodes.

2. The aqueous anodizing electrolytic solution according to claim 1 wherein said organic solvent is selected from the group consisting of monomeric glycols, glycerine, polyethylene glycols, polyethylene glycol monomethyl ethers, polyethylene glycol dimethyl ethers, and mixtures thereof.

3. The aqueous anodizing electrolytic solution of claim 1 wherein the alkanolamine is selected from the group consisting of monoethanol amine, diethanol amine, triethanol amine, ethyl diethanolamine, diethyl ethanolamine, dimethyl ethanolamine, and dimethyl amino ethoxy ethanol.

4. The aqueous anodizing electrolytic solution according to claim 1 wherein the amount of the alkanolamine is between about 0.1 vol % and about 6 vol % of the total volume of the electrolytic solution.

5. The aqueous anodizing electrolytic solution according to claim 1 wherein the total volume of the organic solvent is above about 5 vol % and less than 35 vol. % of the total aqueous anodizing electrolytic solution volume.

6. The aqueous anodizing electrolytic solution according to claim 5 wherein the total volume of the organic solvent is above about 10 vol % and less than 25 vol. % of the total aqueous anodizing electrolytic solution volume.

7. The aqueous anodizing electrolytic solution according to claim 1 wherein the total volume of the organic solvent is about 50 vol % to about 70 vol % of the total aqueous anodizing electrolytic solution volume.

8. The aqueous anodizing electrolytic solution of claim 1 wherein the organic solvent is polyethylene glycol 300 and the alkanolamine is monoethanol amine or dimethyl ethanol amine.

9. The aqueous anodizing electrolytic solution of claim 1 wherein the pH is about 5 to about 9.

10. The aqueous anodizing electrolytic solution of claim 9 wherein the pH is about 7.

11. A method of anodizing a metal anode from a valve metal powder comprising anodizing the metal anode with an aqueous anodizing electrolyte comprising about 0.1 vol % and about 2.0 vol % phosphoric acid, above about 1 vol % to about 70 vol % of at least one organic solvent and about 0.1 vol % to about 10 vol % of at least one alkanolamine, wherein the electrolytic solution is suitable for anodizing metal anodes.

12. The method according to claim 11 wherein said valve metal is tantalum or niobium.

13. The method according to claim 1 wherein the valve metal powder has a surface area of least 0.35 m$^2$/g or 35,000 CV/g, and the aqueous anodizing electrolytic solution comprises about 0.1 vol % and about 2.0 vol % phosphoric acid, about 10 vol % to about 25 vol % of the at least one organic solvent and about 0.1 vol % to about 6 vol % of the alkanolamine.

14. The method according to claim 11 wherein the valve metal powder has a surface area of less than 0.35 m$^2$/g or 35,000 CV/g and the aqueous anodizing electrolytic solution comprises about 0.1 vol % and about 2.0 vol % phosphoric acid, about 50 vol % to about 70 vol % of the at least one organic solvent and about 0.1 vol % to about 6 vol % of the alkanolamine.

15. A capacitor comprising an anode prepared from a valve metal powder comprising anodizing the metal anode with an aqueous anodizing electrolyte comprising about 0.1 vol % and about 2.0 vol % phosphoric acid, above about 1 vol % to about 70 vol % of at least one organic solvent and about 0.1 vol % to about 10 vol % of at least one alkanolamine, wherein the electrolytic solution is suitable for anodizing metal anodes.

16. The capacitor according to claim 15 wherein said organic solvent is selected from the group consisting of monomeric glycols, glycerine, polyethylene glycols, polyethylene glycol monomethyl ethers, polyethylene glycol dimethyl ethers, and mixtures thereof.

17. The capacitor according to claim 15 wherein the alkanolamine is selected from the group consisting of monoethanol amine, diethaiol amine, triethanol amine, ethyl diethanol amine, diethyl ethanol amine, dimethyl ethanol amine, and di methyl amino ethoxy ethanol.

18. The capacitor according to claim 15 wherein the total volume of the organic solvent is above about 5 vol % and less than 35 vol % of the total aqueous anodizing electrolytic solution volume.

19. The capacitor according to claim 15 wherein the total volume of the organic solvent is above about 10 vol % and less than 25 vol % of the total aqueous anodizing electrolytic solution volume.

20. The capacitor according to claim 15 wherein the valve metal powder has a surface area of least 0.35 m$^2$/g or 35,000 CV/g and the aqueous anodizing electrolytic solution comprises about 0.1 vol % and about 2.0 vol % phosphoric acid, about 10 vol % to about 25 vol % of the at least one organic solvent and about 0.1 vol % to about 6 vol % of the alkanolamine.

21. The capacitor according to claim 15 wherein the valve metal powder has a surface area of less than 0.35 m$^2$/g or 35,000 CV/g and the aqueous anodizing electrolytic solution comprises about 0.1 vol % and about 2.0 vol % phosphoric acid, about 50 vol % to about 70 vol % of the at least one organic solvent and 0.1 vol % to about 6 vol % of the alkanolamine.

22. The capacitor according to claim 15 wherein the pH of the aqueous anodizing electrolytic solution is about 5 to about 9.

* * * * *